United States Patent
Parameswaran et al.

(10) Patent No.: US 9,021,307 B1
(45) Date of Patent: Apr. 28, 2015

(54) VERIFYING APPLICATION DATA PROTECTION

(71) Applicant: EMC Corporation, Hopkinton, MA (US)

(72) Inventors: Rajesh Parameswaran, Bangalore (IN); Ajith Balakrishnan, Bangalore (IN); Sumit Basu Mallick, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 133 days.

(21) Appl. No.: 13/803,554

(22) Filed: Mar. 14, 2013

(51) Int. Cl.
G06F 11/00 (2006.01)
G06F 11/30 (2006.01)

(52) U.S. Cl.
CPC .......... *G06F 11/3034* (2013.01); *G06F 11/008* (2013.01)

(58) Field of Classification Search
CPC .................................................. G06F 11/008
USPC ....................... 714/1, 37, 47.1, 47.3; 705/7.28
See application file for complete search history.

(56) References Cited

U.S. PATENT DOCUMENTS

| | | | |
|---|---|---|---|
| 6,490,621 B1 * | 12/2002 | Forget et al. | 709/224 |
| 6,857,020 B1 * | 2/2005 | Chaar et al. | 709/226 |
| 7,467,329 B1 * | 12/2008 | Keeton et al. | 714/15 |
| 7,536,585 B1 * | 5/2009 | Keeton et al. | 714/47.2 |
| 7,685,269 B1 * | 3/2010 | Thrasher et al. | 709/224 |
| 7,873,732 B2 * | 1/2011 | Chen et al. | 709/226 |
| 8,078,918 B2 * | 12/2011 | Diggs et al. | 714/42 |
| 8,099,488 B2 * | 1/2012 | Laye et al. | 709/224 |
| 2005/0102547 A1 * | 5/2005 | Keeton et al. | 714/1 |
| 2008/0301394 A1 * | 12/2008 | Muppirala et al. | 711/170 |
| 2009/0138306 A1 * | 5/2009 | Coburn et al. | 705/7 |
| 2009/0150711 A1 * | 6/2009 | Kami et al. | 714/1 |
| 2009/0300409 A1 * | 12/2009 | Bates et al. | 714/5 |
| 2010/0107015 A1 * | 4/2010 | Bernabeu-Auban et al. | 714/38 |
| 2012/0023372 A1 * | 1/2012 | Lin et al. | 714/37 |
| 2012/0096158 A1 * | 4/2012 | Astete et al. | 709/225 |
| 2012/0233501 A1 * | 9/2012 | Kanso et al. | 714/26 |
| 2013/0031424 A1 * | 1/2013 | Srivastava et al. | 714/47.2 |
| 2013/0060933 A1 * | 3/2013 | Tung et al. | 709/224 |
| 2013/0080841 A1 * | 3/2013 | Reddy et al. | 714/47.3 |
| 2013/0211871 A1 * | 8/2013 | Ghosh et al. | 705/7.28 |
| 2013/0232382 A1 * | 9/2013 | Jain et al. | 714/48 |
| 2013/0297283 A1 * | 11/2013 | Maeno | 703/21 |
| 2014/0006862 A1 * | 1/2014 | Jain et al. | 714/26 |

(Continued)

OTHER PUBLICATIONS

Gill et al., Understanding Network Failures in Data Centers: Measurement, Analysis, and Implications, Aug. 2011, pp. 1-12.*

(Continued)

*Primary Examiner* — Marc Duncan
(74) *Attorney, Agent, or Firm* — BainwoodHuang (57) ABSTRACT

A technique for verifying the safety of tenant data in a data center includes creating a topological map of storage constructs used for storing the tenant data within the data center. The topological map includes a logical storage device, a physical storage device, and a set of hardware structures disposed between the logical and physical storage devices. The constructs of the topological map are evaluated to generate an individual assessment of fault tolerance of each construct, and a set of rules are applied to generate an overall assessment of the safety of the tenant data. In an example, an administrator may operate this technique on a tenant application and generate a report for the tenant summarizing the results.

20 Claims, 3 Drawing Sheets

(56) References Cited

U.S. PATENT DOCUMENTS

| | | | |
|---|---|---|---|
| 2014/0157062 A1* | 6/2014 | Bird et al. | 714/47.1 |
| 2014/0189432 A1* | 7/2014 | Gokhale et al. | 714/41 |
| 2014/0223240 A1* | 8/2014 | Patil et al. | 714/47.1 |
| 2014/0258782 A1* | 9/2014 | Jones et al. | 714/33 |

OTHER PUBLICATIONS

Mudigonda et al., NetLord: A Scalable Multi-Tenant Network Architecture for Virtualized Datacenters, Aug. 2011, pp. 1-12.*

"EMC Appsync Simple, SLS-Driven Application Protection for VNX," EMC Data Sheet, 2012, downloaded from http://www.emc.com/collateral/data-sheet/h11078-appsync-ds.pdf, downloaded on Apr. 11, 2013, 2 pages.

"EMC Data Protection Advisor Fast, Smart and Automatic Data Protection," EMC Data Sheet, 2009, downloaded from http://www.emc.com/collateral/software/data-sheet/h1767-data-protection-advisor-ds.pdf, downloaded on Apr. 11, 2013, 6 pages.

"EMC Powerpath Family: Powerpath and Powerpath/VE Multipathing," EMC Data Sheet, 2002, downloaded from http://www.emc.com/collateral/software/data-sheet/1751-powerpath-ve-multipathing-ds.pdf, downloaded on Apr. 11, 2013, 3 pages.

"EMC Unified Infrastructure Manager," EMC Data Sheet, Dec. 2012, downloaded from http://www.emc.com/collateral/data-sheet/h11358-unified-infrastructure-manager-ds.pdf, downloaded on Apr. 11, 2013, 4 pages.

"Using EMC® Celerra Replicator™ (V2)," Celerra Network Server Technical Module, EMC, Feb. 2009, downloaded from ftp://202.119.166.5/lxh/Document/EMC/NASDOC5-6-43/DocCDUserPublish/help/Documentation/TechnicalModulesPDF/Extra/RepOnCel.pdf, downloaded on Apr. 11, 2013, 184 pages.

"EMC TimeFinder Product Description Guide," EMC Corporation, 1998, downloaded from http://www.emc.com/collateral/software/timefinder.pdf, downloaded on Apr. 11, 2013, 34 pages.

"EMC SRDF Family of Software," EMC Data Sheet, 2009, dowloaded from http://www.emc.com/collateral/software/data-sheet/1523-emc-srdf.pdf, downloaded on Apr. 11, 2013, 4 pages.

* cited by examiner

VERIFYING APPLICATION DATA PROTECTION

BACKGROUND

Data centers commonly provide computational resources to their tenants in the form of online data storage and/or data processing services. Tenants often store their valuable data and run their critical software applications at such data centers. Users of the software applications, such as the tenants' customers, may then access the software applications over the Internet or some other network. In one example, a tenant is an on-line retail business operating a website hosted by the data center. The tenant purchases data storage and processing services provided through the data center, and retail customers access the website to make their on-line purchases over the Internet. In another example, a tenant is an individual who stores his or her applications and/or data (e.g., files, photos, videos, etc.) at the data center, which appears to the individual tenant to be "in the cloud."

Data centers commonly employ virtual machines to provide data processing services to their tenants. As is known, a "virtual machine" is a software implementation of a physical computing machine, which may appear on a network as a distinct computer but may in fact be one of multiple virtual machines running on a single server. Virtual machines are popular in data centers because they are readily transportable between physical servers and thus promote load balancing and the capability to failover from one physical server to another.

When tenants purchase computational resources from the provider of a data center, the tenants often pay for and expect to receive a certain minimum level of service. Service level may be specified for a variety of performance-related and/or reliability-related measures.

SUMMARY

Virtual machines confer many benefits to data centers and their tenants but often make it difficult for tenants to know the exact physical locations where their valuable data are stored. Virtual machines store data on virtual disks, but virtual disks are logical constructs that do not themselves reveal the underlying infrastructure of the data center involved in storing particular data. Thus, with prior data center technology, it is often difficult for tenants to know the locations of their data storage, including whether their valuable data are safe.

Data centers are vulnerable to loss of tenant data due to data corruption, disk drive failures, path failures, and other device failures, for example. Data centers are also vulnerable to data loss in the event of natural disasters, such as fires, floods, and earthquakes. In the highly virtualized environment of a data center, what is needed is a way for tenants to be informed of the protection status and safety of their particular data.

In contrast with prior data center technology, a technique for verifying the safety of tenant data in a data center includes creating a topological map of storage constructs used for storing the tenant data within the data center. The topological map includes a logical storage device, a physical storage device, and a set of hardware structures disposed between the logical and physical storage devices. The constructs of the topological map are evaluated to generate an individual assessment of fault tolerance of each construct, and a set of rules are applied to generate an overall assessment of the safety of the tenant data. In an example, an administrator may operate this technique on a tenant application and generate a report for the tenant summarizing the results.

Certain embodiments are directed to a method of verifying that data of a tenant application running in a data center is safe from data center failures. The method includes querying a set of data sources within the data center to identify a set of storage path constructs used by the tenant application for storing the data of the tenant application. The storage path constructs include a logical storage device used by the tenant application, a physical storage device used by the tenant application, and a set of hardware structures disposed between the logical storage device and the physical storage device used by the tenant application. The method further includes evaluating each of the set of storage path constructs to generate an assessment of fault tolerance of the respective storage path construct, and applying a set of rules to the assessments generated across the set of storage path constructs to yield an overall assessment of the safety of the tenant application data.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

A technique for verifying the safety of tenant data in a data center includes creating a topological map of storage constructs used for storing the tenant data within the data center, evaluating the fault tolerance of each storage construct in the topological map, and applying a set of rules to generate an overall assessment of the safety of the tenant data.

In an example, the disclosed technique may be implemented as a software program that performs a simulated data recovery drill on a tenant's application. Like a fire drill, which may be performed to assess the preparedness for a fire of procedures, personnel, and equipment, a data recovery drill assesses the extent to which a tenant's valuable data is (or is not) protected at a given point in time should a data center failure occur. The data center failure may range from an individual component failure to a catastrophic failure in which the entire data center becomes disabled.

Figure 1:
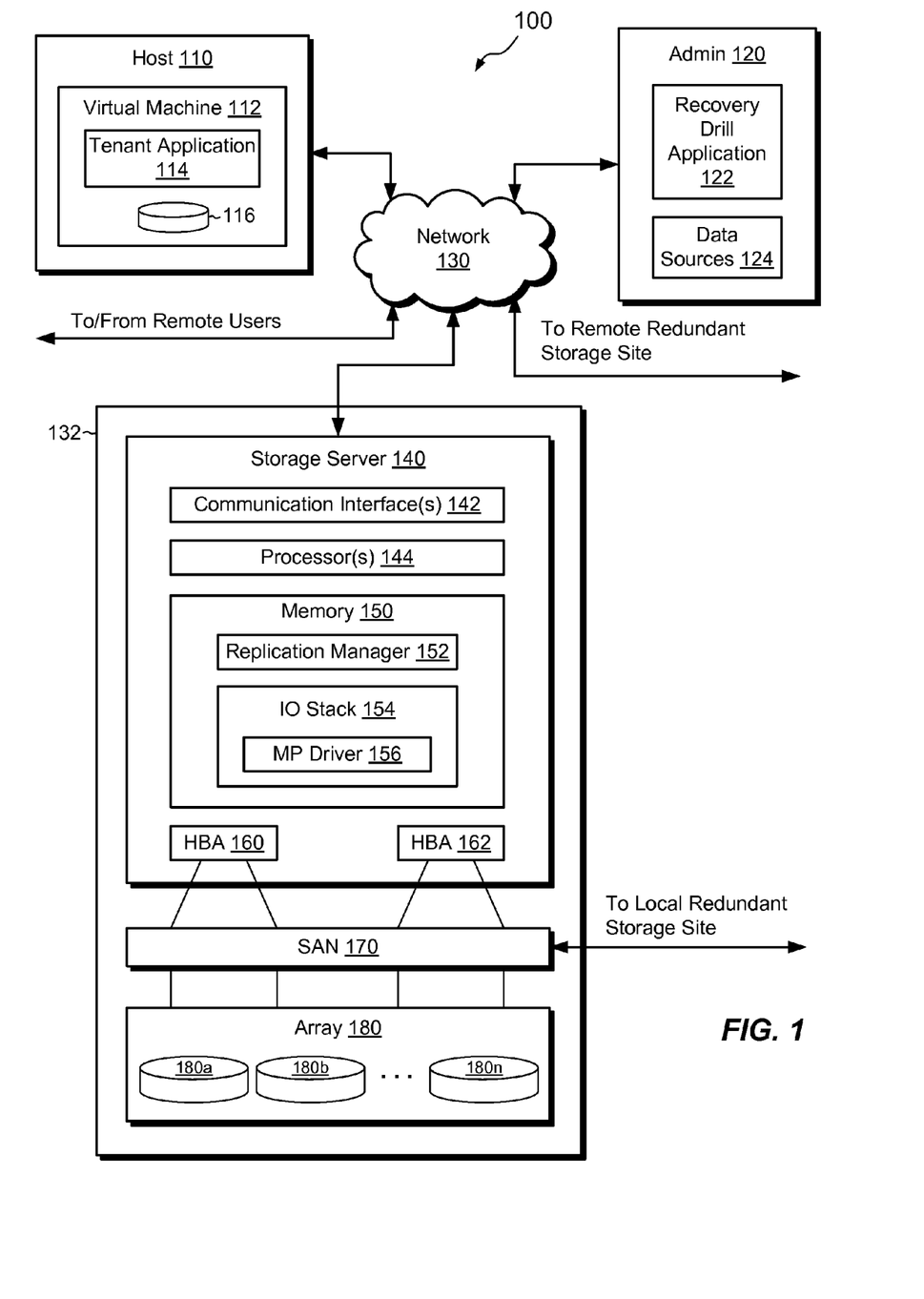
FIG. 1 is a block diagram of an example data center environment in which techniques hereof for verifying host application data protection may be practiced.

FIG. 1 shows an example data center environment 100 in which embodiments of the technique hereof can be practiced. As shown, the data center environment 100 includes a host computer 110, an administrative computer 120, a network 130, and a data storage system 132.

The host computer 110 (i.e., the "host") operates a virtual machine 112, which runs a tenant application 114. The virtual machine 112 has a virtual disk 116 for storing data of the tenant application, i.e., "tenant data." The virtual disk 116 is not a physical disk but rather a logical representation of a disk (or set of disks) in memory of the host 110. Although only a single virtual machine 112 is shown, the host 110 may operate a number of different virtual machines at any given time. Also, it is understood that the host 110 may be any type of computing device. In an example, the host 110 is a compute server blade installed in a chassis (not shown) of the data center environment 100. The data center environment 100 will typically include many hosts, like the host 110, which may run the same tenant application 114 or different tenant applications, on behalf of the same tenant or different tenants.

The administrative computer 120 hosts a recovery drill application 122 and various data sources 124. In an example, the recovery drill application 122 is configured to query various elements of the data center environment 100, including the data sources 124, and to generate an assessment of the safety of tenant data. The data sources 124 provide configuration information, settings, and performance information pertaining to the data storage system 132, and may include, for example, administrative tools, drivers, and other programs. Any number of data sources 124 may be provided, and they may be located anywhere in the data center environment 100. The administrative computer 120 may be any type of computing device. In one example, the administrative computer 120 is implemented as a server blade in the same chassis in which the host computer 110 is housed, or in a different chassis. In another example, the administrative computer 120 is itself a virtual machine, which may be hosted by any physical computing device of the data center environment 100.

The network 130 includes a variety of network components, such as Internet Protocol (IP) switches, routers, and cables, for example, and forms an infrastructure for implementing a Local Area Network (LAN) or some other computing network within the data center environment 100. In an example, the network 130 is connected to the Internet, for enabling communication with various remote users and with a redundant storage site (e.g., a replication site). In some examples, the network 130 also includes components for Fibre Channel and/or other block-based protocols, which enable the host 110 to send SCSI (Small Computer System Interface) IO requests to the data storage system 132. Such requests may specify data reads and writes to particular LUNs (Logical Unit Numbers, i.e., logical disk volumes) and particular offset ranges within the LUNs. The network 130 may also convey IO requests from the host 110 to the data storage system 132 in a file-based protocol, such as NFS, CIFS, or SMB 3.0, for example.

The data storage system 132 is seen to include a storage server 140, a storage area network (SAN) 170, and an array 180. In an example, the SAN 170 includes multiple switches for routing IO requests received from the storage server 140 to the array 180. The array 180 includes magnetic disk drives, electronic flashdrives, and/or other non-volatile storage media, shown generally as storage devices 180a through 180n. It is understood that the data storage system 132 may include any number of storage servers connected to the SAN 170, and that any number of data storage systems 132 may be provided within the data center environment 100.

The storage server 140 includes a set of communication interfaces 142 (e.g., network interface cards, SCSI adapters, etc.), a set of processors 144 (i.e., one or more processing chips and/or assemblies), memory 150, and host bus adapters (HBAs) 160 and 162. The HBAs 160 and 162 plug into a bus (e.g., a PCI bus) of the storage server 140 and transmit IO requests down paths to the array 180, as managed by the multipathing driver 156, described below. The memory 150 includes both volatile memory (e.g., RAM) and non-volatile memory, such as one or more disk drives, solid state drives (SSDs) and the like.

The memory 150 stores various software constructs. These include, for example, a replication manager 152 and an IO stack 154. The IO stack 154 includes the multipathing (MP) driver 156. It is understood that the memory 150 typically includes many other software constructs, which are not shown, such as an operating system and various applications, processes, and daemons.

The replication manager 152 manages replication of data stored on the array 180 to local and/or remote redundant storage sites. In an example, the replication manager 152 performs both synchronous replication and asynchronous replication. Synchronous replication operates by mirroring data writes sent to the array 180 to the redundant storage as the writes are occurring, i.e., in band with IO requests received by the storage server 140. By comparison, asynchronous replication operates out of band with IO requests based on snaps of data objects stored in the array 180. For example, the replication manager 152 may asynchronously replicate a LUN realized on the array 180 by identifying differences between consecutive snaps of the LUN and sending the differences to the redundant storage site for safekeeping.

The IO stack 154 processes read and write IO requests arriving at the storage server 140. The IO requests may arrive in the form of block-based IO requests (e.g., specifying a LUN and an offset range) or file-based requests (e.g., specifying a particular file system, path, and file name). The IO stack 154 also provides caching services.

The MP driver 156 performs multipathing operations to select particular paths (SCSI "ITLs" or Initiator-Target-LUNs) to be used for transmitting IO requests to the array 180. In an example, the MP driver 156 collects metrics pertaining to the status of different paths between the storage server 140 and the array 180. As will be described, the MP driver 156 may also serve as a data source for the recovery drill application 122.

In operation, the host 110 runs the tenant application 114 in the virtual machine 112, and the tenant application 114 performs reads and writes to the virtual machine disk 116. As the virtual machine disk 116 is not a physical disk but rather a memory construct, the read and write requests to the virtual machine disk 116 are translated into read and write IO requests, which the host 110 sends through the network 130 to the data storage system 132. The storage server 140 processes the IO requests, i.e., via the communication interfaces 142, the IO stack 154, and the HBAs 160 and 162. The IO requests are sent via selected paths to the SAN 170 and then to the array 180, where they are further processed to perform actual read and write operations on the storage devices 180a through 180n.

Asynchronously with the operation of the host 110 and the data storage system 132, an administrator of the data center environment 100 may run the recovery drill application 122. In an example, the administrator running the recovery drill application 122 may specify a tenant application, such as the tenant application 114, as the object of the recovery drill. The recovery drill application 122 proceeds to query one or more data sources (e.g., one or more of the data sources 124, the MP driver 156, and/or other data sources) within the data center environment 100, to identify storage path constructs involved in handling the data of the tenant application 114. The recovery drill application 122 then evaluates the identified storage path constructs, or some subset of the identified storage path constructs, and generates an assessment of the fault tolerance of each respective storage path construct. The recovery drill application 122 then applies a set of rules to the assessments to yield an overall assessment of safety of the tenant application data. The recovery drill application 122 may generate one or more reports. In an example, the reports specify the following:

(1) A single view of tenant application to storage and data protection schema regardless of the number of virtualized layers involved.
(2) The extent of protection available to the tenant application 114;
(3) Disaster readiness of the tenant application 114 at a given point in time;
(4) Steps that can be performed to make the tenant application 114 disaster ready at the given point in time;
(5) The extent to which any RTO (Recovery Point Objective)/RTO (Recovery Time Objective) goals, as specified in the tenant's service level agreement, are met, as well as the availability of crash consistent and application consistent replicas as of the given point in time;
(6) A severity analysis assessing the vulnerability of the tenant application 114 to failures in different storage path constructs, to help prioritize corrective actions.

In some examples, evaluating the identified storage path constructs involves assessing the level of redundancy for each storage path construct. The recovery drill application 122 may simulate failures of different storage path constructs and identifies the consequences of each such failure. The recovery drill application 122 may also simulate the failure of the entire data center environment 100 and to assess the ability to apply off-site, redundant clones and/or snaps of the tenant data to fully restore the tenant data.

In an example, the recovery drill application 122 also performs an impact analysis to assess any data center failure from the perspective of business continuity. The recovery drill application 122 takes into account financial, operational, and service impacts of any data center failure. Vulnerabilities and fault tolerance to single point failures are also assessed and reported.

Figure 2:
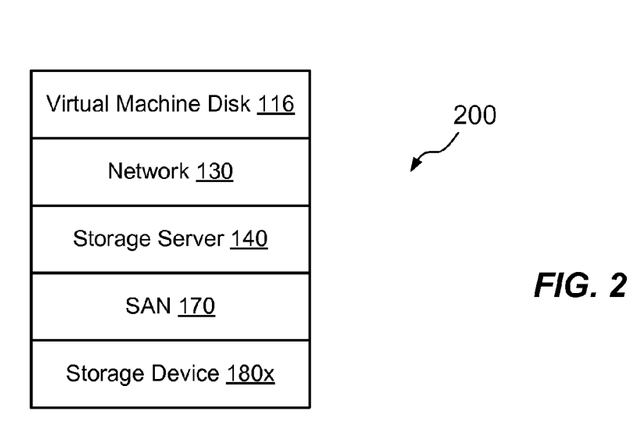
FIG. 2 is a block diagram showing different layers of storage constructs presented in the environment of FIG. 1.

FIG. 2 shows an example topographical map 200 of storage path constructs used by the tenant application 114 for storing tenant data. The topological map 200 includes the virtual machine disk 116, the network 130, the storage server 140, the SAN 170, and the physical storage device or devices 180x within the array 180, where the tenant data are physically stored. Each of the storage path constructs 116, 130, 140, 170, and 180x is involved in storing the data of the tenant application 114 in the sense that each logically represents the storage, physically stores the content, or participates in conveying the data between the virtual machine 112 and the array 180. Although only five storage path constructs are shown, additional constructs may be provided to indicate higher levels of granularity. For example, the network 130 could be resolved into particular cables, switches, circuit boards, ports, and so forth, with each such structure representing a different storage path construct. Similarly, the SAN 170 could be resolved into separate cables, paths, switches, and so forth. Also, the topological map 200 is merely an example, which corresponds to the data center environment 100. As the environment 100 is also merely an example, it is understood that the topological map 200 may take a variety of forms, based on the software and hardware architecture of the particular data center environment used.

In an example, the recovery drill application 122 evaluates each of the storage path constructs, or a subset of the storage path constructs, individually, to generate an assessment of fault tolerance. Taking the storage path constructs of FIG. 2 in order, the recovery drill application 122 may evaluate:

(1) The virtual machine disk 116. For example, the recovery drill application 122 assesses the redundancy and failover settings of the virtual machine 112 running the virtual machine disk 116 on the host 110, e.g., whether the virtual machine 112 is configured to failover to another host. The recovery drill application 122 may then assign the virtual machine disk 116 a level of risk (e.g., a score between 1 and 5) to indicate the safety of data on the virtual machine disk 116, where a score of 1 indicates an unsafe condition and a score of 5 indicates a very safe condition. In some examples, the recovery drill application 122 operates to provoke a failover of the host 110 to another host, monitors the failover performance, and evaluates the virtual machine disk 116 accordingly.

(2) The network 130. For example, the recovery drill application 122 assesses the number of redundant paths between the host 110 and the data storage system 132. The recovery drill application 122 may then assign the network 130 a score of 1 if there is low redundancy (e.g., if there is only a single network path between the host 110 and the data storage system 132) and a score of 5 if there is high redundancy (e.g., many independent network paths between the host 110 and the data storage system 132). In some examples, the recovery drill application 122 simulates a failed network component and monitors the network 130 to assess whether the network 130 can adequately route around the failed component.

(3) The storage server 140. For example, the recovery drill application 122 assesses the consequences of a failed storage server. If the storage server 140 cannot failover to any other storage server, the storage server 140 may receive a low score (e.g., 1), but if there are many other storage servers to which the storage server 140 can failover, the storage server 140 may receive a high score (e.g., 5). Also, the recovery drill application 122 assesses policy settings of the replication manager 152. The replication manager 152 is checked to determine whether local and/or remote clones and/or snaps are configured according to its policy, and how often such clones and/or snaps are made. Data logs of replication sessions are read, to verify that clones and/or snaps are successfully completed at the scheduled times. High scores are awarded for frequent and confirmed clones and/or snaps, whereas low scores are provided for infrequent and/or unconfirmed clones and/or snaps. Scores may vary based on the RPO/RTO goals specified in the tenant's service level agreement. For example, high scores may be reported even for relatively low values of RPO/RTO if the values specified in the tenant's service level agreement are low. Conversely, low scores may be reported for relatively high values of RPO/RTO if the values specified in the tenant's service level agreement are high. The recovery drill application 122 may also monitor the status of clones and/or snaps to check that they are suitable for use in reconstructing tenant data. In addition, the recovery drill application 122 may provoke an storage server failover, monitor the resulting behavior, and score the storage server 140 based on how nondisruptively it fails over.

(4) The SAN 170. For example, the recovery drill application 122 assesses the number of possible paths through the SAN 170 to the array 180 that can be used. The SAN 170 receives a low score if there are few alternative paths and receives a high score if there are many. The recovery drill application 122 can simulate failed paths and observe the ability of the SAN 170 to route around the failed paths.

(5) Storage Device 180x. For example, the storage device 180x is evaluated to determine whether proper RAID (Redundant Array of Independent Disks) settings are established, and what degree of storage redundancy is provided at the physical storage level. The recovery drill application may test the RAID settings, for example, by disabling a particular disk drive and observing the response of the array 180 in repairing the desired level of redundancy.

Rather than generating a single score for each storage path construct, the recovery drill application 122 may instead produce multiple scores for multiple factors. For example, one factor may relate to safety in the event of a single-point failure of the storage path construct assuming the data center environment 100 is otherwise operational. Another factor may relate to safety in the event that the data center as a whole becomes unavailable, such as might occur during a natural disaster.

Given the individual evaluations of the storage path constructs 116, 130, 140, 150 and/or 180x, the recovery drill application 122 applies a set of rules to the assessments generated across the storage path constructs (or a subset thereof) to yield an overall assessment of the safety of the tenant application data. The set of rules can be arbitrarily simple or complex. In one example, the overall assessment is simply a sum (e.g., a weighted sum) of the single scores obtained from evaluating each of the storage path constructs 116, 130, 140, 150 and/or 180x. In another example, multiple scores from each storage path construct are considered and combined using an algorithm that is optimized for accurately predicting disaster preparedness. The recovery drill application 122 may thus be regarded, for example, as a mashup, which combines data from multiple data sources (i.e., the data sources 124, as well as other data sources) to create a new service for assessing tenant data safety and disaster preparedness.

Figure 3:
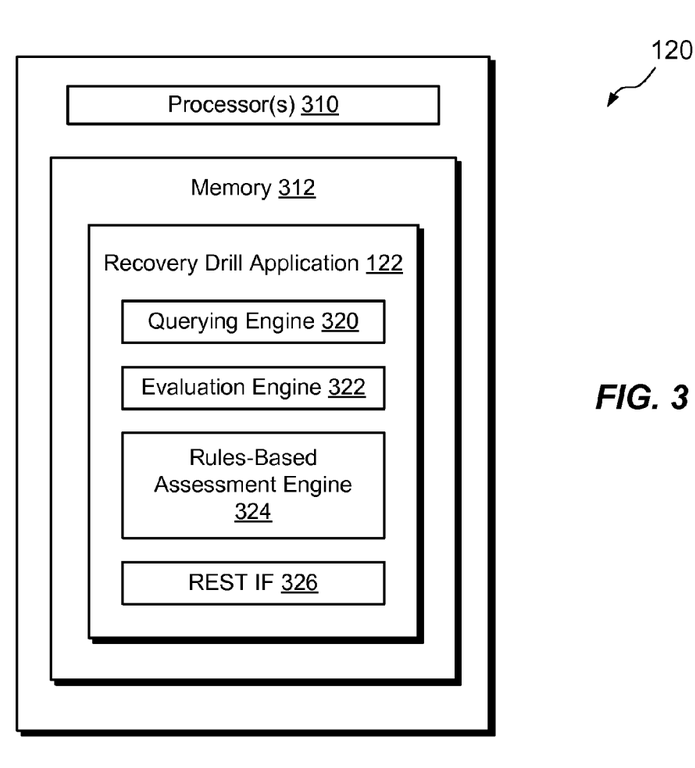
FIG. 3 is a block diagram of an example administrative application for verifying host application data protection in the environment of FIG. 1.

FIG. 3 shows an example administrative computer 120 in additional detail. Here, it is seen that the administrative computer 120 includes a set of processors 310 (i.e., one or more processing chips and/or assemblies) and memory 312. The memory 312 includes both volatile memory (e.g., RAM) and nonvolatile memory (e.g., ROM, disk drives, and/or solid state drives). The memory 312 stores the recovery drill application 122. The set of processors 310 and the memory 312 together form control circuitry, which is constructed and arranged to carry out various methods and functions as described herein. Also, the memory 312 includes a variety of software constructs realized in the form of executable instructions. When the executable instructions are run by the set of processors 310, the set of processors 310 are made to carry out the operations of the software constructs. Although certain software constructs are specifically shown and described, it is understood that the memory 312 typically includes many other software constructs, which are not shown, such as an operating system and various applications, processes, and daemons.

The recovery drill application 122 is seen to include a querying engine 320, an evaluation engine 322, a rules-based assessment engine 324, and a software interface, such as a REST (Representational State Transfer) interface 326. The query engine 320 is constructed and arranged to query a set of data sources within the data center environment 100 to identify a set of storage path constructs used by the tenant application 114 (e.g., those shown in FIG. 2) for storing the data of the tenant application 114. The evaluation engine 322 is constructed and arranged to evaluate each of the set of storage path constructs (e.g., as shown in FIG. 2) to generate an assessment of fault tolerance of the respective storage path construct. The rules-based assessment engine 324 is constructed and arranged to apply the set of rules to the assessments generated across the set of storage path constructs to yield the overall assessment of the safety of the tenant application data. In addition, the REST interface 326 is constructed and arranged to communicate with the data sources 124, as well as other data sources in other locations of the data center environment 100.

In an example, each of the data sources 124 also has a respective REST interface. The data sources may include, for example, the MP driver 156 (e.g., PowerPath), a replication monitoring application (e.g., AppSync), a data protection advisor application (e.g., DPA), and a unified infrastructure manager (e.g., UIM). PowerPath, AppSync, DPA, and UIM are software products available from EMC Corporation of Hopkinton, Mass. Other data sources may be provided, as well, such as a data source within the virtual machine 112, a data source for monitoring the network 130, and a data source for monitoring the SAN 170, for example.

Figure 4:
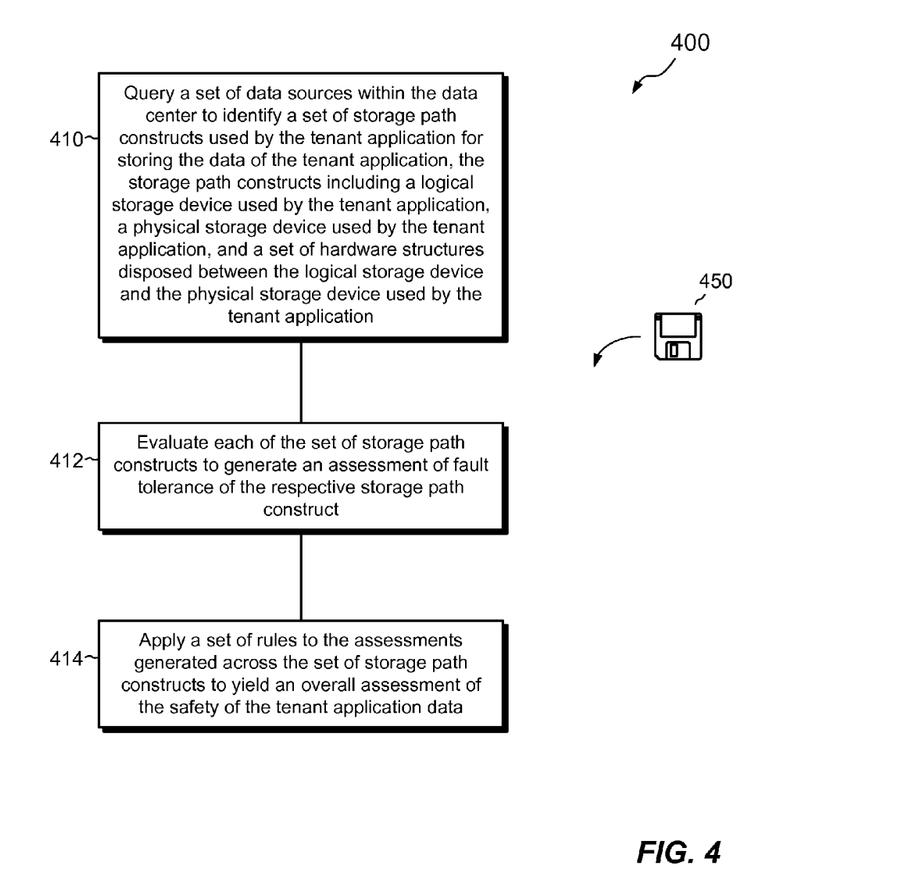
FIG. 4 is a flow chart showing an example process for verifying host application data protection.

FIG. 4 shows an example process 400 for verifying that data of a tenant application running in a data center is safe from data center failures. The process 400 that may be carried out in connection with the data center environment 100. The process 400 are typically performed by the recovery drill application 122, described in connection with FIGS. 1-3, which resides in the memory 312 of the administrative computer 120 and is run by the set of processors 310. The various acts of the process 400 may be ordered in any suitable way. Accordingly, embodiments may be constructed in which acts are performed in orders different from those illustrated, which may include performing some acts simultaneously, even though the acts are shown as sequential in the illustrated embodiments.

At step 410, a set of data sources (e.g., data sources 124, as well as other data sources) within the data center 100 are queried to identify a set of storage path constructs (e.g., those shown in FIG. 2) used by the tenant application 114 for storing the data of the tenant application 114. The storage path constructs include a logical storage device (e.g., the virtual memory disk 116) used by the tenant application 114, a physical storage device (e.g., 180x) used by the tenant application 114, and a set of hardware structures (e.g., the network 130, storage server 140, and SAN 170) disposed between the logical storage device and the physical storage device used by the tenant application 114.

At step 412, each of the set of storage path constructs is evaluated to generate an assessment of fault tolerance of the respective storage path construct. For example, the storage constructs of FIG. 2, or some subset thereof, are each scored to produce an assessment of fault tolerance.

At step 414, a set of rules is applied to the assessments generated across the set of storage path constructs to yield an overall assessment of the safety of the tenant application data. For example, the scores may be combined to produce a weighted sum, or a more complex algorithm may be applied, as described in reference to FIG. 2.

A technique has been described for verifying the safety of tenant data in a data center. The technique includes creating a topological map of storage constructs used for storing the tenant data within the data center. The topological map includes a logical storage device, a physical storage device, and a set of hardware structures disposed between the logical and physical storage devices. The constructs of the topological map are evaluated to generate an individual assessment of fault tolerance of each construct, and a set of rules are applied to generate an overall assessment of the safety of the tenant data. In an example, an administrator may operate this technique on a tenant application and generate a report for the tenant summarizing the results.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Having described certain embodiments, numerous alternative embodiments or variations can be made. For example, although the virtual machine 112 is shown and described as running on the host 110, this arrangement is not required. For example, the virtual machine 112 may also be run directly on the storage server 140, or an any other suitable computing machine. More generally, it should be understood that the arrangement of the data center environment 100 is merely illustrative, and that the principles disclosed herein may be applied to a wide range of data center configurations.

Also, although the data center environment 100 is shown and described with reference to virtual machines, this also is merely an example. Alternatively, the host 110 (of the storage server 140) may execute the tenant application 114 directly, i.e., without using a virtual machine. Thus, rather than referring to a virtual machine disk 116, the tenant application 114 may instead refer simply to a LUN or to a file. Both LUNs and files may be considered to be logical "storage path constructs," as that term is used herein.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 450 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of verifying that data of a tenant application running in a data center is safe from data center failures, comprising:
   querying a set of data sources within the data center to identify a set of storage path constructs used by the tenant application for storing the data of the tenant application, the storage path constructs including a logical storage device used by the tenant application, a physical storage device used by the tenant application, and a set of hardware structures disposed between the logical storage device and the physical storage device used by the tenant application;
   evaluating each of the set of storage path constructs to generate an assessment of fault tolerance of the respective storage path construct; and
   applying a set of rules to the assessments generated across the set of storage path constructs to yield an overall assessment of the safety of the tenant application data,
   wherein the data center includes a data storage system,
   wherein a first storage path construct of the set of storage path constructs is a logical disk used by the tenant application,
   wherein a second storage path construct of the set of storage path constructs is a physical storage element of the data storage system that stores at least some of the data of the logical disk,
   wherein the tenant application runs on a virtual machine,
   wherein the logical disk is a virtual disk of the virtual machine, and
   wherein the physical storage element stores at least some of the data of the virtual disk of the virtual machine.

2. The method of claim 1,
   wherein the data center includes a host computer on which the virtual machine is operated,
   wherein the host computer is coupled to the data storage system through the network;
   wherein the data storage system includes a storage server, a SAN (Storage Area Network), and a storage array, the storage server coupled to the storage array through the SAN, and
   wherein the set of storage path constructs include the network and the SAN.

3. The method of claim 2, wherein evaluating each of the set of storage path constructs includes identifying a set of consequences that would result from a failure of the respective storage path construct to operate.

4. The method of claim 2, further comprising identifying a set of consequences that would result from an outage of the entire data center.

5. The method of claim 1, further comprising communicating with the data sources to obtain information about the safety status of the set of storage constructs.

6. The method of claim 5, further comprising identifying, from the information obtained from the data sources, a set of policies for making redundant copies of the tenant application data and a set of log files identifying actual times when copies in accordance with the set of policies have been made.

7. The method of claim 6, wherein the set of policies pertain to making both local and remote redundant copies of the tenant application data, and wherein the policies further pertain to making at least one of snaps and clones of the tenant application data.

8. The method of claim 6,
   wherein the data center operates the tenant application in accordance with a service level agreement that specifies a required RPO (Recovery Point Objective) and RTO (Recovery Time Objective), wherein the set of policies identify actual values of RPO and RTO in effect for the tenant application, and wherein evaluating each of the set of storage constructs to generate an assessment of fault tolerance includes comparing the RPO and RTO of the service level agreement with the actual values of RPO and RTO from the set of policies to determine whether the RPO and RTO of the service level agreement are being met.

9. The method of claim 5, further comprising identifying, from the information obtained from the data sources, information describing redundancy provided for at least one storage path construct disposed between the physical and logical storage devices used by the tenant application.

10. The method of claim 1, wherein applying the set of rules to the assessments generated across the set of storage path constructs to yield the overall assessment of the safety of the tenant application data includes assessing a business impact that describes expected consequences of a lack of business continuity resulting from disruption of the tenant application.

11. The method of claim 1, wherein the method further comprises provoking a failover from a first host running the tenant application in the virtual machine to a second host, monitoring failover performance, and evaluating the virtual disk of the virtual machine.

12. The method of claim 11, further comprising generating a report providing a severity analysis that assesses the vulnerability of the tenant application to failures in different storage path constructs, to help prioritize corrective actions.

13. The method of claim 1, wherein querying the set of data sources includes querying a multipathing driver coupled to the physical storage element in the data storage system.

14. A computerized apparatus including a set of processors and memory, the memory coupled to the set of processors and storing executable instructions, which when executed by the set of processors cause the set of processors to perform a method of verifying that data of a tenant application running in a data center is safe from data center failures, the method comprising:

querying a set of data sources within the data center to identify a set of storage path constructs used by the tenant application for storing the data of the tenant application, the storage path constructs including a logical storage device used by the tenant application, a physical storage device used by the tenant application, and a set of hardware structures disposed between the logical storage device and the physical storage device used by the tenant application;

evaluating each of the set of storage path constructs to generate an assessment of fault tolerance of the respective storage path construct; and applying a set of rules to the assessments generated across the set of storage path constructs to yield an overall assessment of the safety of the tenant application data wherein the data center includes a data storage system, wherein a first storage path construct of the set of storage path constructs is a logical disk used by the tenant application, wherein a second storage path construct of the set of storage path constructs is a physical storage element of the data storage system that stores at least some of the data of the logical disk, wherein the tenant application runs on a virtual machine, wherein the logical disk is a virtual disk of the virtual machine, and wherein the physical storage element stores at least some of the data of the virtual disk of the virtual machine.

15. The computerized apparatus of claim 14, wherein evaluating each of the set of storage path constructs includes identifying a set of consequences that would result from a failure of the respective storage path construct to operate.

16. The computerized apparatus of claim 15, wherein the method further comprises:

communicating with the data sources to obtain information about the safety status of the set of storage constructs; and identifying, from the information obtained from the data sources, a set of policies for making redundant copies of the tenant application data and a set of log files identifying actual times when copies in accordance with the set of policies have been made.

17. The computerized apparatus of claim 16, wherein the method further comprises identifying, from the information obtained from the data sources, information describing redundancy provided for at least one storage path construct disposed between the physical and logical storage devices used by the tenant application.

18. A non-transitory computer readable medium including instructions which, when executed by a set of processors of a computerized apparatus, cause the set of processors to perform a method of verifying that data of a tenant application running in a data center is safe from data center failures, the method comprising:

querying a set of data sources within the data center to identify a set of storage path constructs used by the tenant application for storing the data of the tenant application, the storage path constructs including a logical storage device used by the tenant application, a physical storage device used by the tenant application, and a set of hardware structures disposed between the logical storage device and the physical storage device used by the tenant application;

evaluating each of the set of storage path constructs to generate an assessment of fault tolerance of the respective storage path construct; and applying a set of rules to the assessments generated across the set of storage path constructs to yield an overall assessment of the safety of the tenant application data, wherein the data center includes a data storage system, wherein a first storage path construct of the set of storage path constructs is a logical disk used by the tenant application, wherein a second storage path construct of the set of storage path constructs is a physical storage element of the data storage system that stores at least some of the data of the logical disk, wherein the tenant application runs on a virtual machine, wherein the logical disk is a virtual disk of the virtual machine, and wherein the physical storage element stores at least some of the data of the virtual disk of the virtual machine.

19. The non-transitory computer readable medium of claim 18, wherein the data center operates the tenant application in accordance with a service level agreement that specifies a required RPO (Recovery Point Objective) and RTO (Recovery Time Objective), wherein a set of policies accessed by the computerized apparatus identify actual values of RPO and RTO in effect for the tenant application, and wherein evaluating each of the set of storage constructs to generate an assessment of fault tolerance includes comparing the RPO and RTO of the service level agreement with the actual values of RPO and RTO from the set of policies to determine whether the RPO and RTO of the service level agreement are being met.

20. The non-transitory computer readable medium of claim 18, wherein applying the set of rules to the assessments generated across the set of storage path constructs to yield the overall assessment of the safety of the tenant application data includes assessing a business impact that describes expected consequences of a lack of business continuity resulting from disruption of the tenant application.

* * * * *